US008166143B2

(12) United States Patent
Guan et al.

(10) Patent No.: US 8,166,143 B2
(45) Date of Patent: Apr. 24, 2012

(54) METHODS, SYSTEMS AND COMPUTER PROGRAM PRODUCTS FOR INVARIANT REPRESENTATION OF COMPUTER NETWORK INFORMATION TECHNOLOGY (IT) MANAGED RESOURCES

(75) Inventors: Jiebo Guan, Missouri City, TX (US); Garve Hays, Cypress, TX (US); Rob Reiner, Cypress, TX (US)

(73) Assignee: NetIQ Corporation, Houston, TX (US)

( * ) Notice: Subject to any disclaimer, the term of this patent is extended or adjusted under 35 U.S.C. 154(b) by 622 days.

(21) Appl. No.: 11/745,002

(22) Filed: May 7, 2007

(65) Prior Publication Data

US 2007/0266139 A1 Nov. 15, 2007

Related U.S. Application Data

(60) Provisional application No. 60/799,540, filed on May 11, 2006.

(51) Int. Cl.
*G06F 15/173* (2006.01)

(52) U.S. Cl. ............ 709/223; 709/200; 709/226; 707/1; 707/100; 707/200; 707/205; 719/316

(58) Field of Classification Search .................. 709/200, 709/223, 224, 226; 707/1, 100, 200, 205; 719/316
See application file for complete search history.

(56) References Cited

U.S. PATENT DOCUMENTS

| | | | | |
|---|---|---|---|---|
| 5,909,544 A * | 6/1999 | Anderson et al. | ............. | 709/208 |
| 6,366,926 B1 * | 4/2002 | Pohlmann et al. | ..... | 1/1 |
| 6,470,384 B1 * | 10/2002 | O'Brien et al. | ............. | 709/223 |
| 6,799,211 B1 * | 9/2004 | Bennett et al. | ............. | 709/224 |
| 6,862,736 B2 * | 3/2005 | Hudis et al. | .................... | 719/316 |
| 6,978,422 B1 * | 12/2005 | Bushe et al. | .................. | 715/734 |
| 2002/0129123 A1 * | 9/2002 | Johnson et al. | ............... | 709/219 |
| 2002/0152294 A1 | 10/2002 | Evans et al. | | |
| 2002/0184533 A1 * | 12/2002 | Fox | ................ | 713/201 |
| 2002/0194340 A1 * | 12/2002 | Ebstyne et al. | ............... | 709/226 |
| 2003/0220892 A1 | 11/2003 | Hand et al. | | |
| 2003/0225801 A1 | 12/2003 | Devarakonda et al. | | |
| 2004/0039745 A1 | 2/2004 | Evans et al. | | |
| 2004/0073532 A1 | 4/2004 | Hiltgen et al. | | |
| 2004/0172463 A1 * | 9/2004 | King et al. | ..................... | 709/223 |
| 2005/0033795 A1 * | 2/2005 | Wood | ............................ | 709/200 |
| 2005/0033829 A1 * | 2/2005 | Oommen | ........................ | 709/220 |
| 2007/0043860 A1 * | 2/2007 | Pabari | ............................ | 709/224 |

(Continued)

*Primary Examiner* — Thuong Nguyen
(74) *Attorney, Agent, or Firm* — Myers Bigel Sibley & Sajovec

(57) ABSTRACT

Methods, systems and computer program products are provided for invariant representation of computer network information technology (IT) managed resources. A common information model for representing the managed resources is defined. An identification of a resource managed by an IT resource management point product is received. The identification includes an identification of a representation used by the point product for the resource managed by the point product. It is determined if an invariant representation for the resource managed by the point product has previously been defined under the common information model. The representation used by the point product for the resource managed by the point product is associated with the previously defined invariant representation for the resource managed by the point product when an invariant representation for resource managed by the point product has been previously defined. A new invariant representation for the resource managed by the point product is defined and associated with the new invariant representation when an invariant representation for resource managed by the point product has not been previously defined. The new invariant representation is a unique representation under the common information model.

18 Claims, 6 Drawing Sheets

U.S. PATENT DOCUMENTS

2007/0233827 A1* 10/2007 McKnight .................... 709/223
2009/0070462 A1* 3/2009 Chong et al. ................. 709/224
2010/0218104 A1* 8/2010 Lewis .......................... 715/736

* cited by examiner

METHODS, SYSTEMS AND COMPUTER PROGRAM PRODUCTS FOR INVARIANT REPRESENTATION OF COMPUTER NETWORK INFORMATION TECHNOLOGY (IT) MANAGED RESOURCES

RELATED APPLICATION

This application claims the benefit of and priority to U.S. Provisional Patent Application No. 60/799,540, entitled "METHODS, SYSTEMS AND COMPUTER PROGRAM PRODUCTS FOR MANAGING INFORMATION TECHNOLOGY(IT) RESOURCES," filed May 11, 2006, the disclosure of which is hereby incorporated herein by reference as if set forth in its entirety.

BACKGROUND OF THE INVENTION

The present invention, generally, relates to computer networks and, more particularly, to methods, systems and computer program products for managing such computer networks.

In today's disparate information technology world, object-oriented information models, such as the Common Information Model (CIM) by Distributed Management Task Force (DMTF) and the NetIQ Common Information Model (IQCIM) by NetIQ Corporation, have become increasingly more critical in enabling different management products from different vendors to exchange semantically rich management information via computer networks. The CIM Query Language (CQL) Specification is discussed at world wide web address dmtg.org/standards/published_documents/DSP0202.pdf.

Object-oriented common information models, such as CIM and IQCIM, represent managed IT resources and their aggregate functions/services having discrete object classes and associations. Objects indicate the existence of the resources and aggregate functions and describe their properties. Associations describe the logical relationships between the objects, such as a computer is being used for an IT service.

As managing IT resources becomes increasingly more important, it may be common for a company to utilize multiple management point products to manage its IT resources. In an enterprise's IT environment, it is common to use different point products purchased from multiple and/or single vendors to manage IT resources from different aspects, such as performance and availability management, change and vulnerability management and/or security event management. It is also common that different point products from different vendors, or even from a single vendor, use different representations for a same IT resource. For example, to represent a same computer object, one point product may use a Fully Qualified Domain Name (FQDN), and another point product may use the FQDN combined with some sort of type data.

Furthermore, there is also no defining standard for storage and retrieval of configuration item (CI) data within a configuration management database (CMDB). Thus, customers in an enterprise IT environment have no means for integrating or leveraging multiple CMDBs from different vendors without substantial custom development by in-house staff or professional services engagements through systems integrators.

In an Information Technology (IT) environment, products can be found that are geared to element management, both by using host based or proxy based agents and also Manager of Managers, which mostly subscribe to event and data from element management applications. It is easy for the administrator of these manager of mangers products to be unaware that specific data or events needed by the product are not available, which could possibly lead to false positive or inaccurate information.

SUMMARY OF THE INVENTION

Embodiments of the present invention provide methods for invariant representation of computer network information technology (IT) managed resources. A common information model for representing the managed resources is defined. An identification of a resource managed by an IT resource management point product is received. The identification includes an identification of a representation used by the point product for the resource managed by the point product. It is determined if an invariant representation for the resource managed by the point product has previously been defined under the common information model. The representation used by the point product for the resource managed by the point product is associated with the previously defined invariant representation for the resource managed by the point product when an invariant representation for resource managed by the point product has been previously defined. A new invariant representation for the resource managed by the point product is defined and associated with the new invariant representation when an invariant representation for resource managed by the point product has not been previously defined. The new invariant representation is a unique representation under the common information model.

In further embodiments, the point product comprises a first point product and the method further includes receiving an identification of a resource managed by a second IT resource management point product. The second point product uses a different representation protocol than the first point product. The identification includes a representation used by the second point product for the resource managed by the second point product. The received identification may be processed as described above with reference to the identification received from the first point product.

The resource managed by the first point product and the resource managed by the second point product may be a same network resource. If so, determining if an invariant representation for the resource managed by the second point product has previously been defined under the common information model includes determining that an invariant representation for the resource managed by the second point product has previously been defined under the common information model and the previously defined invariant representation has the representation used by the first point product for the same network resource associated therewith. Associating the representation used by the second point product for the resource managed by the second point product with the previously defined invariant representation may include associating the representation used by the second point product for the same network resource with the previously defined invariant representation to provide the same network resource with a single invariant representation under the common information model linked to the respective representations used by both the first and second point products.

In other embodiments, the method further includes receiving a request to provide IT resource management values, the request including an identification of the previously defined invariant representation. A first view of IT resource management values available from the first point product is obtained based on the representation used by the first point product for the same network resource responsive to the received request to provide IT resource management values. A second view of IT resource management values available from the second point product is obtained based on the representation used by the second point product for the same network resource responsive to the received request to provide IT resource management values. A combined view of IT resource management values is provided based on the obtained first and second views. Obtaining a first view may include communicating with the first point product using an application program interface (API) of the first point product and obtaining a second view may include communicating with the second point product using an application program interface (API) of the second point product.

In other embodiments, receiving a request to provide IT resource management values includes receiving the request to provide IT resource management values from a higher level management application. Obtaining the first view is carried out by a first management service application that implements the common information model for the first point product and obtaining the second view is carried out by a second management service application, different from the first management service application, that implements the common information model for the second point product.

In further embodiments, the identification of the representation used by the first point product for the resource managed by the first point product comprises a list of signature attributes known by the first point product for the resource managed by the first point product. The identification of the representation used by the second point product for the resource managed by the second point product comprises a list of signature attributes known by the second point product for the resource managed by the second point product. Determining if an invariant representation for the resource managed by the first point product has been previously defined includes comparing the list of signature attributes from the first point product with signature attributes of previously defined invariant representations under the common information model. Determining if an invariant representation for the resource managed by the second point product has been previously defined includes comparing the list of signature attributes from the second point product with signature attributes of previously defined invariant representations under the common information model. Receiving an identification of a resource managed by the first or second point product may include receiving a request from the first or second point product for an invariant representation of the resource managed by the first or second product.

In yet other embodiments of the present invention, methods for invariant representation of computer network information technology (IT) managed resources include defining a common information model for representing the managed resources. A request for an invariant representation of one of the managed resource is received from a IT resource management point product. The request includes a list of signature attributes known by the point product for the one of the managed resources. It is determined if an invariant representation for the one of the managed resources has previously been defined under the common information model. The previously defined invariant representation is provided to the requesting point product when the invariant representation for the one of the managed resources has previously been defined. A new invariant representation for the one of the managed resources is determined and provided to the requesting point product when the invariant representation for the one of the managed resources has not been previously defined. The new invariant representation is a unique representation under the common information model.

In some embodiments, determining if an invariant representation for the resource managed by the point product has previously been defined includes comparing the list of signature attributes from the point product with signature attributes of previously defined invariant representations under the common information model. Receiving a request may include receiving requests for an invariant representation from a plurality of different point products, ones of which use different representation protocols for representing managed resources. The signature attributes may be a domain name system (DNS) name, a Net-bios name, an internet protocol (IP) address and/or a media access control (MAC) address.

In other embodiments, the method further includes receiving a request to provide IT resource management values, the request including an identification of the previously defined invariant representation. A first view of IT resource management values for the one of the managed resources associated with the previously defined invariant representation is obtained from a first one of the point products. A second view of IT resource management values for the one of the managed resources associated with the previously defined invariant representation is obtained from a second one of the point products. A combined view of IT resource management values is provided based on the obtained first and second views.

In further embodiments, receiving the request includes receiving the request from an integrated network management application. Providing a combined view includes providing the combined view to the integrated network management application. Obtaining a first view, obtaining a second view and providing a combined view are carried out by a management service application coupled between the first and second one of the point products and the integrated network management application. The integrated network management application may obtain a user friendly name associated with the previously defined invariant representation, modify the combined view of IT resource management values based on the obtained user friendly name and present the modified combined view of IT resource management values to a user. Obtaining a user friendly name may include obtaining the user friendly name from a resource name resolution service application that is operatively coupled to the integrated network management application and the point products and receiving a request for an invariant representation, determining if an invariant representation for the one of the managed sources, providing the previously defined invariant representation and defining a new invariant representation may be carried out by the resource name resolution service application.

In yet further embodiments, systems for invariant representation of computer network information technology (IT) managed resources include a database including a plurality of invariant representations of managed resources of the computer network defined under a common information model. A communication interface of the system is configured to receive a request for an invariant representation of a managed resource from a requesting application. The request includes a representation for the managed resource used by the requesting application. Received requests are received from a plurality of different IT resource management point products, ones of which use different representation protocols for representing managed resources. A resource name resolution service application of the system is configured to provide a selected one of the invariant representations associated with the managed resource identified in the received request based on the included representation of the managed resource.

In other embodiments, the system further includes a central resource manager application that couples the resource name resolution service to the database. The system may further include the plurality of point products, an integrated network management application configured to present a combined view of IT resource management values to a user, the combined view including management values obtained from different ones of the point products using the invariant representations, and a management service application communicatively coupling the integrated network management application to the point products using the invariant representations. The management service application may be a plurality of management service applications coupling associated ones of the point products to the integrated network management application. The integrated network management application may be configured to obtain user friendly names associated with the invariant representations and use the user friendly names in the combined view presented to the user.

DESCRIPTION OF EMBODIMENTS OF THE PRESENT INVENTION

Figure 1:
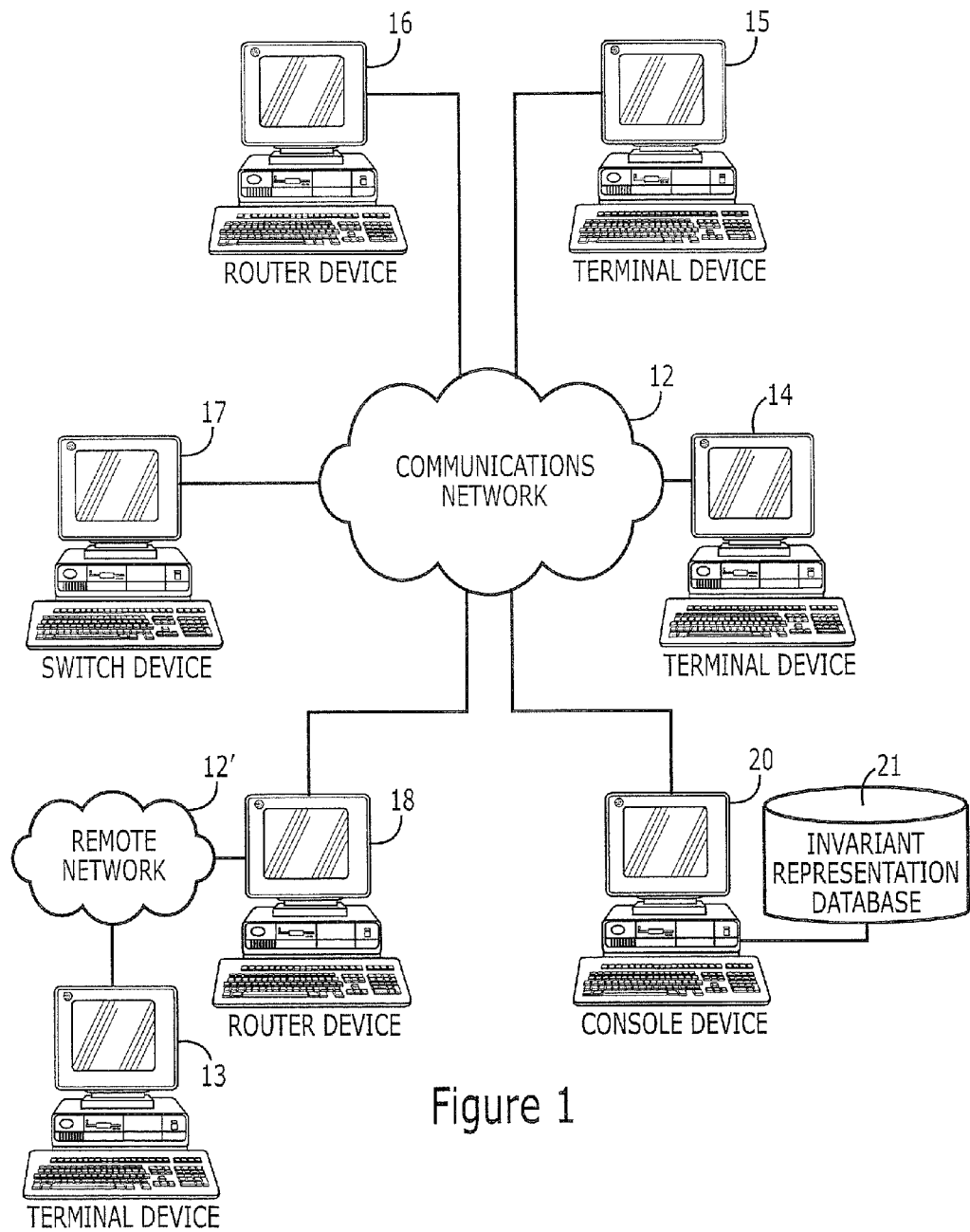
FIG. 1 is a block diagram of a hardware and software environment in which the present invention may operate according to some embodiments of the present invention.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer usable storage medium having computer-usable program code means embodied in the medium. Any suitable computer readable medium may be utilized including hard disks, CD-ROMs, optical storage devices, or magnetic storage devices.

Computer program code for carrying out operations of the present invention may be written in an object oriented programming language such as Java® or C++. However, the computer program code for carrying out operations of the present invention may also be written in conventional procedural programming languages, such as the "C" programming language or assembly language. The program code may execute entirely on the user's computer, partly on the user's computer, as a stand alone software package, partly on the user's computer and partly on a remote computer, or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the acts specified in the flowchart and/or block diagram block or blocks.

Some embodiments of the present invention may provide methods, systems and computer program products that combine views from different point products, which may allow IT administrators to have better understandings of issues regarding IT resources and, therefore, enhance the quality and efficiency of businesses. In particular, disparate representations of IT resources by different point products may make it difficult for enterprises to combine the power of multiple point products to achieve better manageability of IT resources. For example, when a security event management product has reported an intrusion alert regarding a computer, and a vulnerability management product has reported a vulnerability regarding a same computer, it may be difficult to combine the information to draw a conclusion, such as the intrusion alert is caused by the vulnerability when those two point products use different representations for a same computer.

Thus, according to some embodiments of the present invention, invariant representations of IT resources may be provided that may allow combination of the power of resources to provide a more useable product as discussed herein. Common information models are introduced to represent the managed resources. The common information models may be implemented once for every pertinent point product. Such an implementation of common information models may be called a management service. On one hand, a management service may utilize point product specific application program interfaces (APIs) to interact with point products. On the other hand, a management service may present IT resources views conforming to common information models. Thus, different management services may represent IT resources in their invariant forms while they provide different instrumentation and properties of IT resources. Based on the invariant representations of IT resources according to some embodiments of the present invention, it may become possible and feasible for a higher level management application to combine multiple management services and create higher level management functions.

Thus, according to some embodiments of the present invention, enterprises may use their existing management point products to achieve higher levels of IT resource manageability. Enterprises may preserve their past investments in point products, while gradually deploying management services and new higher level management applications. Existing point products may remain functional during the whole process of management services deployments and higher level management applications deployments.

Still further embodiments of the present invention provide methods, systems and computer program products that provide generalized access to and from CMDBs in a federated manner. Methods, systems and computer program products according to some embodiments of the present invention leverage NetIQ's Enterprise IT Model for Invariant (and Explicit) Representation as discussed above. Some embodiments of the present invention impose an invariant representational model of a configuration management database as a subset of IT Infrastructure Library (ITIL). Some embodiments of the present invention not only provide an ontological description for the contents of CMDBs, such as configuration items, but a working implementation as well. The ability to orchestrate between disparate CMDBs may provide a key strategic element to business process analysis and automation.

Some embodiments of the present invention provide methods, systems and computer program products that provide a Mid-level Management Application that is configured to analyze and to identify needed coverage by third party products based on user defined relationships through rules, so that the Management application can request the deployment of knowledge or infrastructure to support the identified riles to the specific third party product or at least let the user know potential data or events gaps from those products. Some embodiments of the present invention provide methods, systems and computer program products for automating the steps used to identify if all the knowledge and infrastructure needed to satisfy user defined policies is deployed and further submit coverage of data and infrastructure to third party products so that they can carry out the appropriate deployment activities. By automating the analysis of the coverage needed against the actual coverage by the third party products, not only may IT environments save time and money resulting from uncoordinated efforts across teams, but ultimately may help ensure the accuracy of the output provided by the Manager of Managers solution.

In particular, the Manager of Managers application according to some embodiments of the present invention may be configured to allow third party applications to register both knowledge that the application can support and what knowledge is currently deployed across a particular computer or group of computers. Knowledge may include, for example, information regarding Objects that are being monitored, state, events, attributes, and actions associated with those objects and the like. Typically, the management of these objects can be performed either by host based agents or by proxy based agents who are responsible for the lifecycle of these objects. The information from the element management application will be provided to the Manager of Managers following our IQCIM knowledge definition process. Therefore, as the Administrator of the Manager of Managers application creates rules and workflows using the element management application list of available objects, the Manager of Managers will check the availability of the objects needed in the rules and/or in the workflows against the particular computer or group of computers to identify whether the appropriate infrastructure and/or knowledge has been deployed properly to support the Manager of Managers application. The system may also submit a request to the third party application to deploy any missing infrastructure and/or knowledge to the desired target computer or group of computers. The rule or workflow will be marked with a special state until the third party application or a user has validated that the requested deployment has been finalized. As new computers are added to groups or as new computers or groups are added to specific rules or workflows, the knowledge verification cycle may be run again.

Thus, according to some embodiments of the present invention, by automating the process of investigation and deployment of knowledge and/or infrastructure available by third party element management applications against the coverage needed by rules and/or workflows in the Manager of Managers application, administrators of these products can be made aware of potential disconnects before these products start reporting false positives. The fact that the Manager of Managers can automate the validation and deployment process and leverage each third party application specific deployment mechanism may save the administrator of the Manager of Managers application the confusion surrounding the different types of knowledge and different mechanisms of deployment for each of the third party products as well as significant coordination and execution time.

It will be understood that implementation of some embodiments of the present invention may cause IT analysts to alter the way in which they perform their duties, rather than performing all steps manually. In particular, some embodiments of the present invention collect information from third Party applications automatically, ask for knowledge available along with actual deployment information of infrastructure and knowledge, store this information to validate that needed information is available in the right computer or group of computers and, finally, submit deployment jobs as needed.

Some embodiments of the present invention will now be described with respect to FIGS. 1 thorough 6 below. Embodiments of the present invention provide methods, systems and computer program products for invariant representation of computer network information technology (IT) managed resources.

Referring first to FIG. 1, a computer network and system having invariant representation of computer network information technology (IT) managed resources according to some embodiments of the present invention will be further described. A hardware and software computer network on which the present invention can operate as shown in FIG. 1 will now be described. As shown in FIG. 1, a communications network 12 includes and provides a communication link between terminal devices 14, 15, router devices 16, 18, switch device 17 and console device 20. The terminal devices 14, 15 may, for example, support users accessing a variety of hardware and software resources of the computer network. The terminal devices 14, 15 may further provide resources for other users and/or may execute applications or agents of applications providing for monitoring resources on the computer network and providing data from such monitoring to a process management system of the present invention and/or carry out actions responsive to the process management system.

As will be understood by those having skill in the art, a communications network 12 may include of a plurality of separate linked physical communication networks, which, using a protocol such as the Internet protocol (IP), may appear to be a single seamless communications network to user application programs. For example, as illustrated in FIG. 1, remote network 12' and communications network 12 may both include a communication node through a port of the router device 18. Accordingly, additional terminal devices or router/switch devices (not shown) or a terminal device 13 on remote network 12' may be part of the computer network and made available for communications from devices on communications network 12. For some embodiments of the present invention, the network to be evaluated may be limited to the local and/or wide area network of a company or the like.

It is further to be understood that, while for illustration purposes in FIG. 1 communications network 12 is shown as a single network, it may be comprised of a plurality of separate interconnected physical networks, one or more of which may be managed according to some embodiments of the present invention. As illustrated in FIG. 1, the devices 13, 14, 15, 16, 17, 18, 20, 21 may reside on a computer. As illustrated by router device 18, a single computer may be coupled to multiple networks (12, 12').

Console node 20, or other means for managing invariant representations for IT managed resources for the computer network may obtain user input, for example, by keyed input to a computer terminal or through a passive monitor, to request and/or provide an invariant representation for a managed resource on the network and may be configured to provide operations as more fully described later herein. The console node 20 is shown as directly coupled to an invariant representation database 21 containing knowledge of already known managed resources and their associated invariant representations. However, the console device 20 may be coupled to the invariant representation database 21, for example, over the communications network 12.

Figure 2:
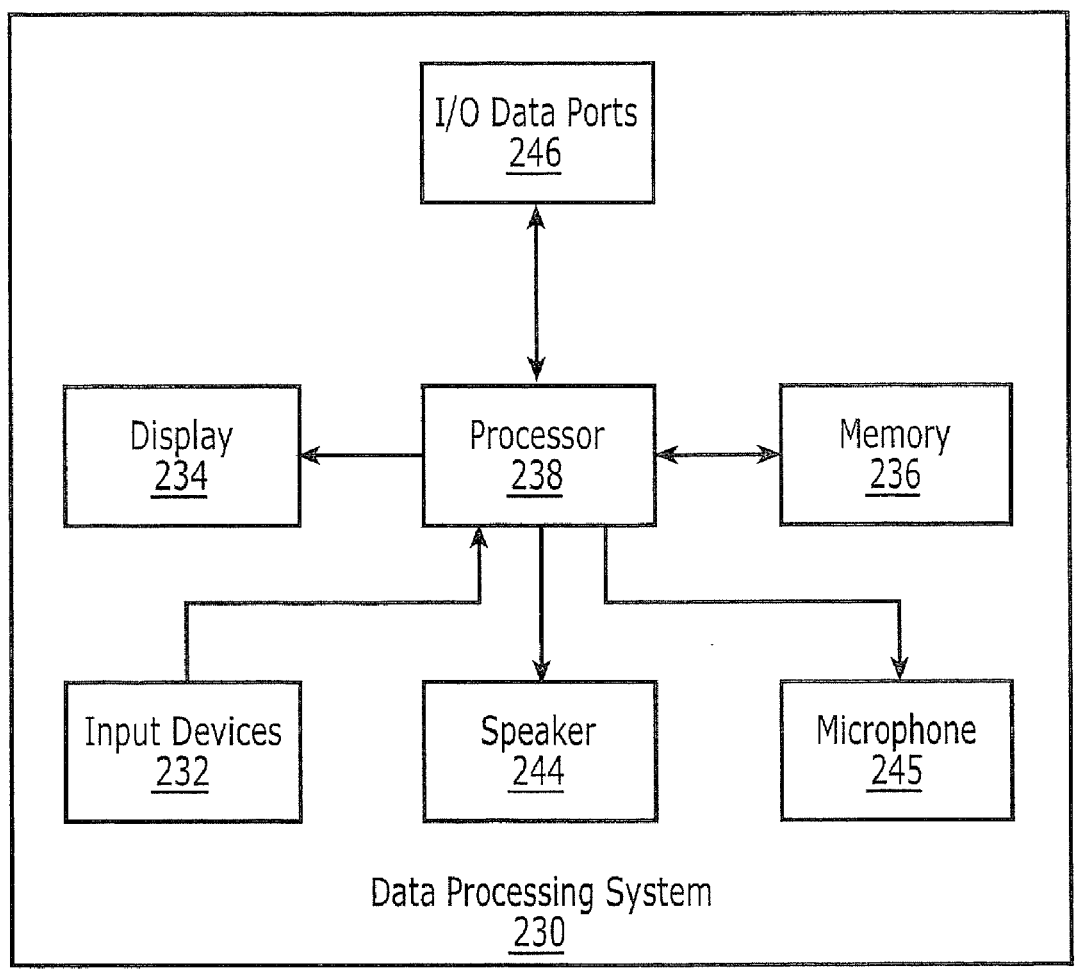
FIG. 2 is a block diagram of a data processing system according to some embodiments of the present invention.

FIG. 2 illustrates an exemplary embodiment of a data processing system 230 in accordance with some embodiments of the present invention. The data processing system 230 typically includes input device(s) 232, such as a keyboard or keypad, a display 234, and a memory 236 that communicate with a processor 238. The data processing system 230 may further include a speaker 244, a microphone 245 and I/O data port(s) 246 that also communicate with the processor 238. The I/O data ports 246 can be used to transfer information between the data processing system 230 and another computer system or a network 12, for example, using an internet protocol (IP) connection. These components may be conventional components, such as those used in many conventional data processing systems, which may be configured to operate as described herein.

Figure 3:
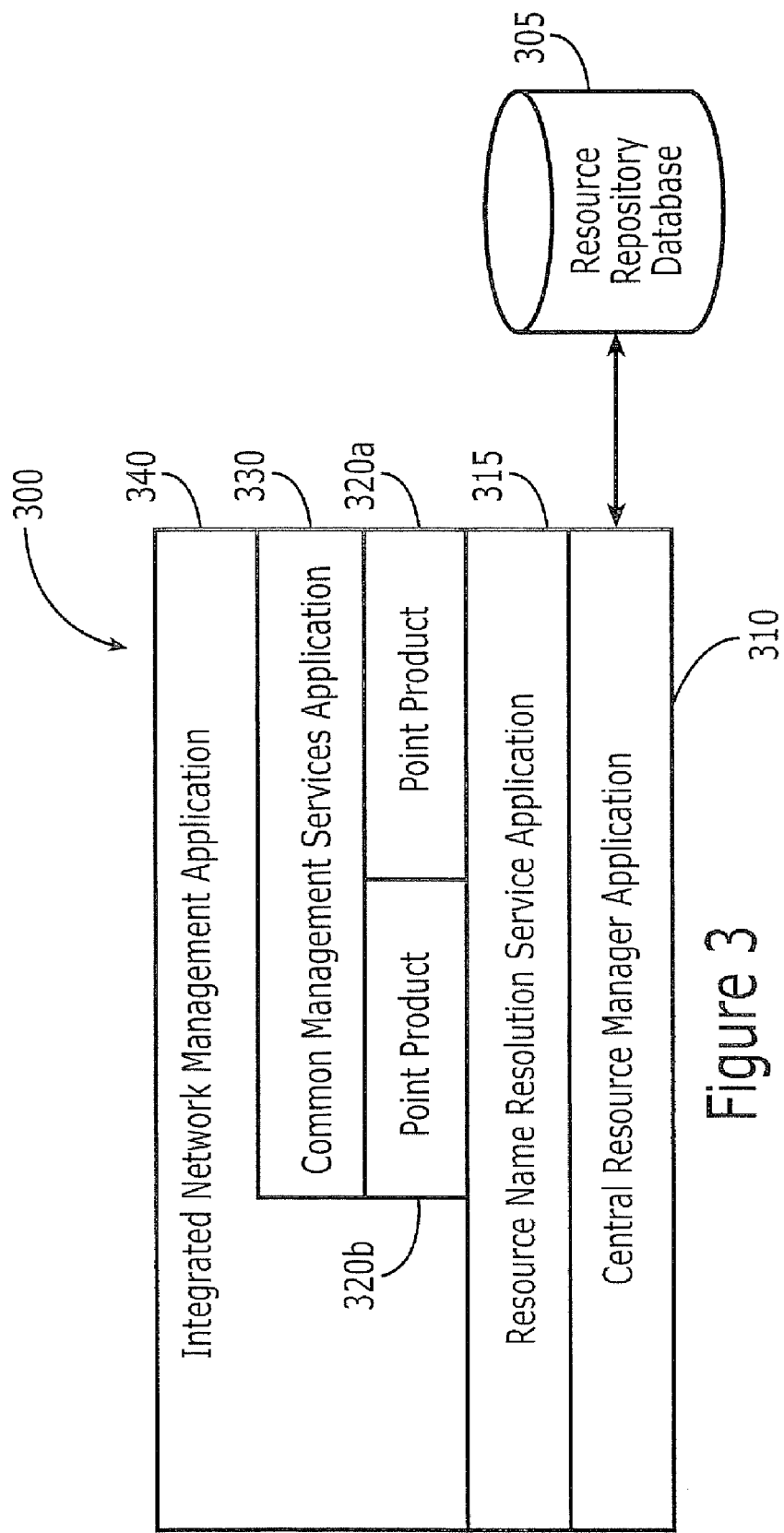
FIG. 3 is a block diagram of an architecture for a data processing system for invariant representation of computer network information technology (IT) managed resources according to some embodiments of the present invention.

FIG. 3 is a block diagram of an architecture for a data processing system 300 that illustrates methods, systems and computer program products for invariant representation of IT managed resources in accordance with some embodiments of the present invention. The various components of the illustrated architecture 300 may be in whole or in part software applications executed by a processor 238 of, for example, the console device 20 of FIG. 1. The processor 238 can be any commercially available or custom microprocessor. Similarly, corresponding software code and/or data used thereby may be stored in a memory 236 of, for example, the console device 20. The memory 236 may be a hierarchy of memory devices containing the software and data used to implement the functionality of the architecture 300. The memory 238 can include, but is not limited to, the following types of devices: cache, ROM, PROM, EPROM, EEPROM, flash memory, SRAM, and DRAM.

As shown in FIG. 3, a system for invariant representation of computer network IT managed resources according to some embodiments of the present invention may include an application architecture 300 and a resource repository database 305 coupled thereto. The database 305 includes a plurality of invariant representations of managed resources of the computer network defined under a common information model and correspond to the invariant representation database 21 of FIG. 1.

The system of FIG. 3 may include a communication interface, such as an interface using the I/O dataports 246 of FIG. 2, which may be configured to receive a request for an invariant representation of a managed resource from a requesting application. The request includes a representation for the managed resource used by the requesting application. More particularly, received requests may be received from a plurality of different IT resource management point products, ones of which use different representation protocols for representing managed resources.

Two exemplary point products 320A, 320B, are illustrated in the hierarchal architecture structure schematically shown in FIG. 3. In addition, FIG. 3 illustrates a central resource manager application 310 and a resource name resolution service application 315, which may alone, or in combination with a central resource manager 310 as shown in FIG. 3, be configured to provide a selected one of the invariant representations associated with a managed resource identified in a received request based on the included representation of the managed resource used by the requesting application. For the embodiments shown in FIG. 3, the separate central resource manager application 310 couples the resource name resolution service application 315 to the database 305.

Also shown schematically in the embodiments of FIG. 3 are a common management services application 330 and an integrated network management application 340. It will be generally understood that the respective applications 310, 315, 320a, 320b, 330, 340 illustrated as architecture 300 of FIG. 3 will typically not be implemented on a single device, such as a console device 20, but will be distributed across various devices on the communications network 12 of FIG. 1. Thus, the central resource manager application 310 and resource name resolution service application 315 may be applications executing on the console device 20 and the database 305 may correspond to the invariant representation database 21 illustrated as communicatively coupled to the console device 20 in FIG. 1. The point products 320a, 320b, will generally be applications executing on other devices on the communications network 12, such as one or more of the terminal devices 13, 14, 15. The common management services application 330 and integrated network management application 340 may be executing as applications on the console device 20 along with the resource name resolution service application 315 and/or the central resource manager application 320 and/or these applications may be installed and executing on other devices coupled to the network. It will be understood that the illustrated terminal devices 13, 14, 15 may be client and/or server devices in a network environment in which the client server model is used for provision of application services.

The integrated network management application(s) 340 may be configured to present a combined view of IT resource management values to a user, where the combined view includes management values obtained from different ones of the point products 320a, 320b using representations associated with respective managed resources by the resource name resolution service application 315. In the particular embodiment shown in FIG. 3, the management services application(s) 330 may communicatively couple the integrated network management application(s) 340 to the point products 320a, 320b using the invariant representations. Note that the management services application(s) 330 may be a plurality of applications coupling associated ones of the point products 320a, 320b to the integrated network management application(s) 340. The integrated network management application(s) 340 may be configured to obtain user friendly names associated with the invariant representations and use the user friendly names in the combined view presented to a user of the IT resource management values.

Thus, in the architecture 300 illustrated in the embodiments of FIG. 3, the central resource manager application 310 implements the resource name resolution service application 315 and stores resource data in the resource repository database 305. The point products 320a, 320b utilize the resource name resolution service application 315 to obtain immutable (invariant) resource identifiers and expose resources to the common management services application(s) 330. The integrated management solution(s) 340 use the resource name resolution service application 315, in some embodiments, to convert immutable resource identifiers back to user friendly names as shown by a portion of the integrated network management application(s) 340 directly contacting the resource name resolution service application 315 in FIG. 3.

Thus, the architecture 300 illustrated in FIG. 3 may allow multiple heterogeneous management point products to work as a whole using invariant representations for the managed resources. The central resource manager application 310 may maintain all managed-resources in an enterprise, including computers, software application, network devices and/or firewalls in the central database 305. The central resource manager application 310 may provide a resource name resolution service to heterogeneous management point products using the resource name resolution service application 315. Internally, each point product 320a, 320b may name its managed resources by its own representation protocol (convention). For example, computers can be named using DNS names, net-bios names, IP-addresses or the like.

Externally, each point product 320a, 320b exposes its managed resources via the common management services application(s) 330 using immutable (invariant) resource identifiers. The invariant resource identifiers are obtained from the central resource manager application 310 via its resource name resolution service application 315. The integrated network management application(s) 340 use the invariant representations for the resources to communicate with the point products 320a, 320b and obtain management data (IT resource management values) from different point product perspectives, such as performance and availability values, configuration vulnerability values and/or security incident values from different point products 320a, 320b. Through the use of an invariant resource identifiers, the integrated network management application(s) 340 may be able to correlate management data from different point products 320a, 320b. Furthermore, using the resource name resolution service application 315 provided by the central resource manager application 310, the integrated network management application(s) 340 may convert invariant resource identifiers back to user friendly names for user friendly reporting purposes.

The resource name resolution service application 315, in some embodiments, may provide two main functions, an immutable resource identifier resolution function and an immutable resource identifier reverse resolution function. As will be further described with reference to the flowcharts herein, the immutable resources identifier resolution procedure may use a list of signature attributes of a resource in order to obtain its invariant resource identifier. Signature attributes, in some embodiments, may include a DNS name, Net-bios name, IP-address, MAC address and/or other native resource identifying data items.

To obtain the invariant resource identifier for a resource, point product 320a, 320b sends its signature attributes to the central resource manager application 310. The central resource manager application 310 uses the signatures to look up the existing immutable resource identifier matching the signature attributes from the database 305. If such an immutable resource identifier (invariant representation) does not yet exist, the central resource manager application 310 may create a new one and associate the signature attributes therewith. Note that the reverse resolution function may be used to take an immutable resource identifier and return its associated signature attributes. Furthermore, in some embodiments, different point products 320a, 320b may supply totally different (non-overlapping) subsets of the signature attributes of a managed resource and, as a result, the central resource manager application 310 may generate multiple immutable resource identifiers for the same managed resource. Thus, in some embodiments, the central resource manager application 310 may provide a user interface to allow user intervention to recognize and combine multiple immutable resources identifiers (invariant representations) that actually correspond to the same managed resource.

It will be understood that FIG. 3 illustrates a block diagram of an architecture for a data processing systems implementing a control device (console node) and/or other device for providing invariant representations of IT managed resources for a computer network according to some embodiments of the present invention. Thus, various of the application modules discussed with respect to FIG. 3 may be located on the console device 20, although they may also be implemented on another device coupled to the computer network.

Figure 4:
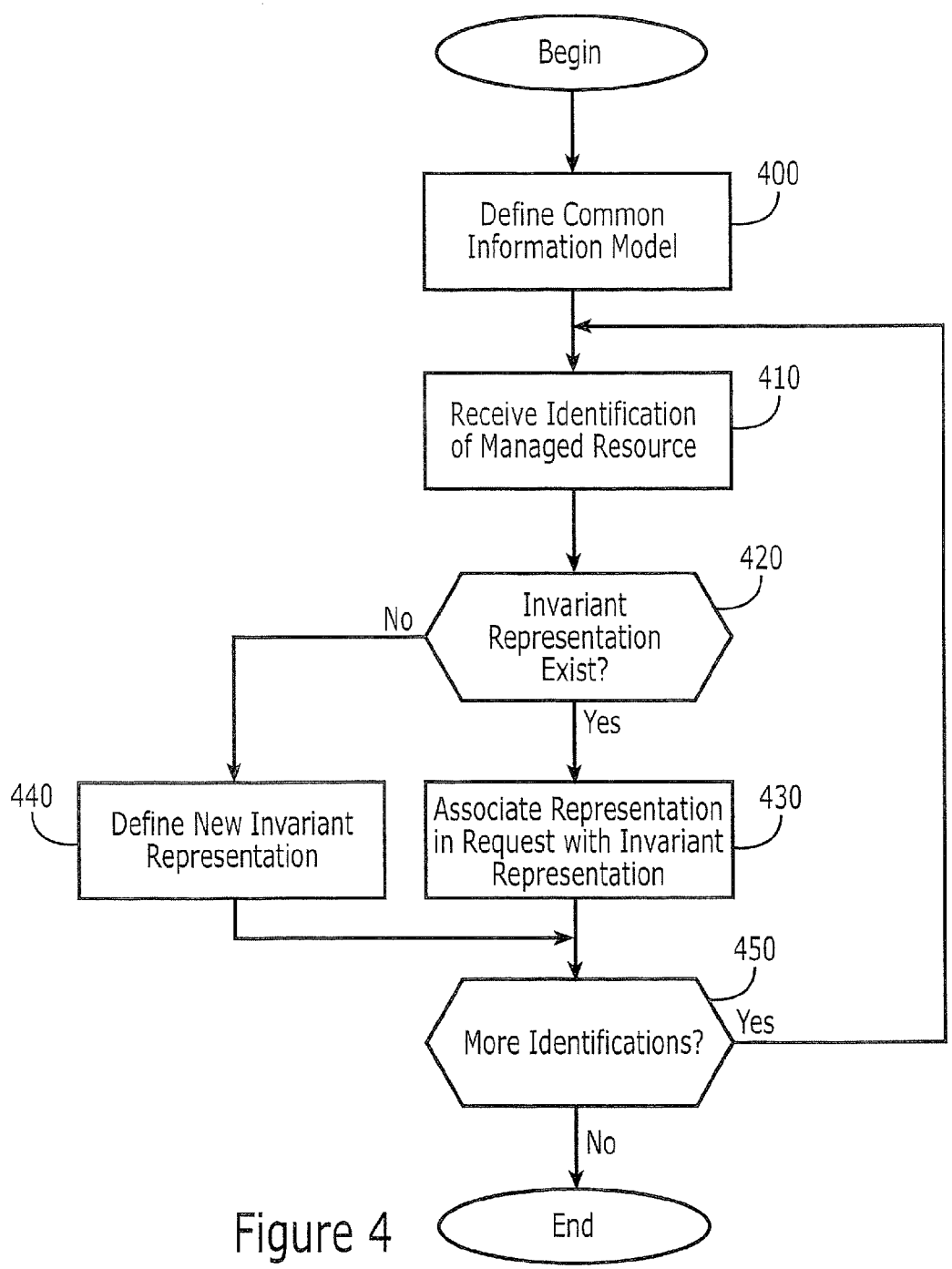
FIGS. 4-6 are flowcharts illustrating operations for invariant representation of computer network information technology (IT) managed resources according to some embodiments of the present invention.

Operations for providing invariant representations according to some embodiments of the present invention will now be further described with reference to the flowchart illustrations of FIGS. 4 through 6. Referring first to FIG. 4, operations begin at block 400 by defining a common information model for representing the managed resources. An identification of a resource managed by an IT resource management point product is received (block 410). The received identification includes an identification of a representation used by the point product for the resource managed by the point product.

If an invariant representation for the resource managed by the point product has previously been defined under the information model (block 420), the representation used by the point product for the resource managed by the point product, is associated with the previously defined invariant representation (block 430). Otherwise, a new invariant representation is defined for the resource managed by the point product (block 440). The representation used by the point product for the resource is associated with the new invariant representation. The new invariant representation is selected so as to provide a unique representation under the common information model. If more identifications are received (block 450), operations at block 410 through 430 are repeated. As such, identifications may be received from a plurality of different point products, each of which may use a different representation protocol and, thus, provide a different representation used by the respective point products for the managed network resources.

Further embodiments of methods for invariant representation of computer network IT managed resources will now be described with reference to the flowchart illustration of FIG. 5. As shown in FIG. 5, operations begin by defining a common information model for representing the managed resources (block 500). A request for an invariant representation of one of the managed resources is received from an IT resource management point product (block 510). The received request includes a list of signature attributes known by the point product for the managed resource. Requests at block 510 may be received from a plurality of different point products, ones of which use different representation protocols for representing the managed resources. In some embodiments, the signature attributes provided by the point product may include a domain name system (DNS) name, a Net-bio name, an Internet protocol (IP) address and/or a media access control (MAC) address. A particular signature attribute or attributes included in the list of signature attributes may vary depending upon the point product from which the request for an invariant representation is received.

If an invariant representation for the managed resource identified in the received request has previously been defined under the common information model (block 520), the previously defined invariant representation is provided to the requesting point product (block 530). Otherwise, a new invariant representation for the managed resource is defined (block 540). The new invariant representation is provided to the requesting point product. The new invariant representation defined at block 540 is a unique representation under the common information model.

In some embodiments, operations to determine if an invariant representation already exists at block 520 include comparing the list of signature attributes from the requesting point product with signature attributes of previously defined invariant representations under the common information model. If more requests are received from the respective point products (block 550), operations return to block 510 and the operations at block 510 through 540 are repeated for the respective requests.

Further embodiments of the present invention will now be described with reference to the flowchart of FIG. 6. In particular, the embodiments of FIG. 6 illustrate operations related to presentation of information utilizing invariant representation of IT managed resources. For the embodiments illustrated in FIG. 6, operations begin by receiving a request to provide IT resource management values (block 600). The request includes an identification of a previously defined invariant representation. In some embodiments, the request may be received from an integrated network management application 340 (FIG. 3).

A first view of IT resource management values for the managed resource or resources identified in the request received at block 600 associated with the previously defined invariant representation is obtained from a first one of a plurality of point products generating management values for the network (block 610). A second view of IT resource management values is obtained from a second one of the point products (block 620). It will be understood that a plurality of different applications may be monitoring resources on the computer network. For example, the applications monitoring resources may include an application manager, a security manager and/or a vulnerability manager, such as those available from NetIQ Corporation of Houston, Tex. The first and second views may be obtained by communicating with the respective point products using an application program interface (API) of the point products. Furthermore, the views at block 620 may be obtained by utilization of a common management service application 330 communicating between the integrated network management application 340 and respective ones of the point products 320, 320b, where the management services application 330 implements the common information model.

A combined view of IT resource management values is provided based on the obtained first and second views (block 630). The combined view may be provided to the integrated network management application 340 and/or generated by the integrated network management application 340.

Figure 6:
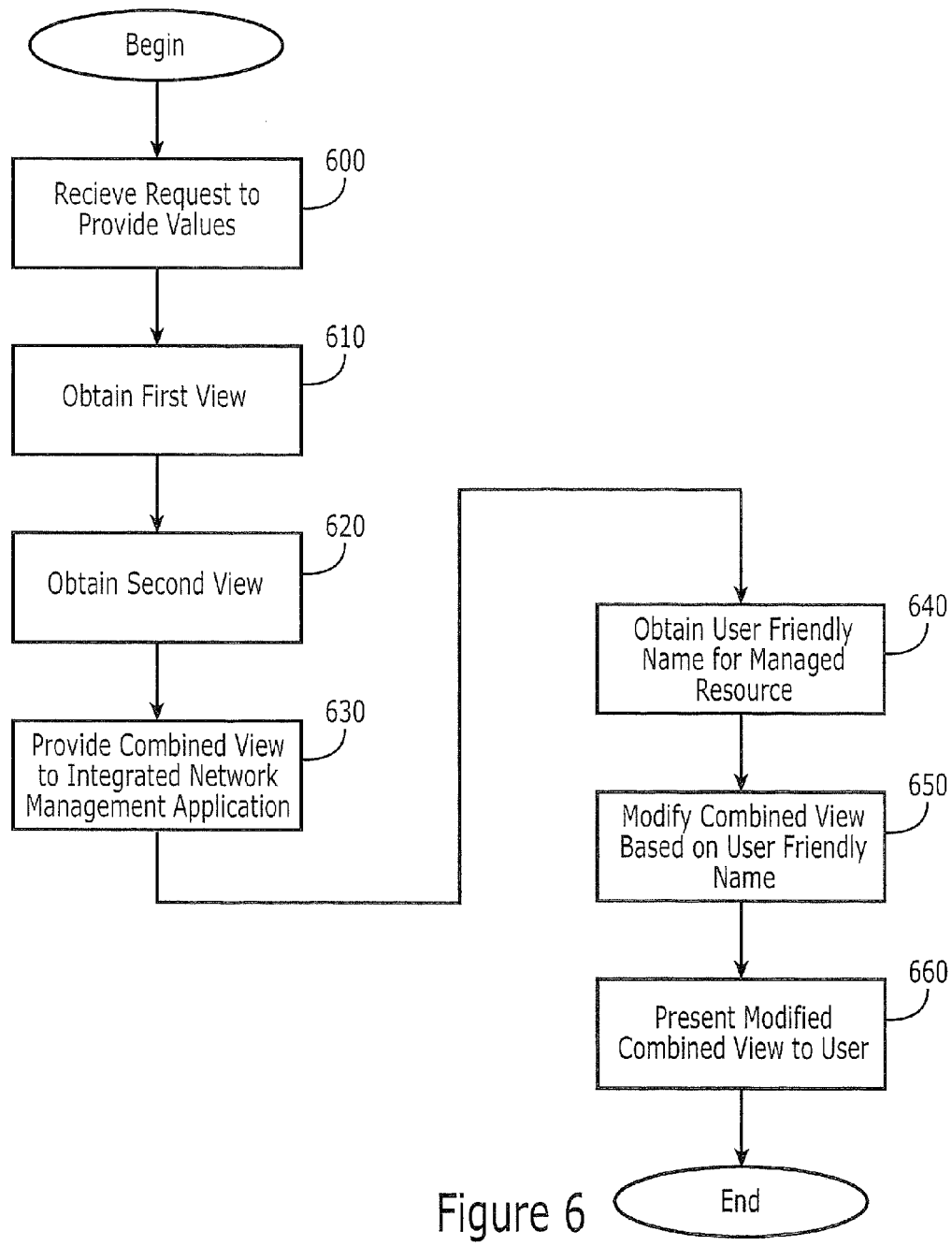

As further shown in FIG. 6, in some embodiments, a user friendly name associated with the previously defined invariant representation is obtained by the integrated network management application 340 (block 640). The user friendly name may be obtained from the resource name resolution resource service application 315. The combined view of IT resource management values is modified based on the obtained user friendly name (block 650). The modified combined view of IT resource management values is presented to a user (block 660).

It will be understood that the block diagrams of FIGS. 1-3 and combinations of blocks in the block diagrams may be implemented using discrete and integrated electronic circuits. It will also be appreciated that blocks of the block diagrams of FIGS. 1-3 and combinations of blocks in the block diagrams may be implemented using components other than those illustrated in FIGS. 1-3, and that, in general, various blocks of the block diagrams and combinations of blocks in the block diagrams, may be implemented in special purpose hardware such as discrete analog and/or digital circuitry, combinations of integrated circuits or one or more application specific integrated circuits (ASICs).

Figure 5:
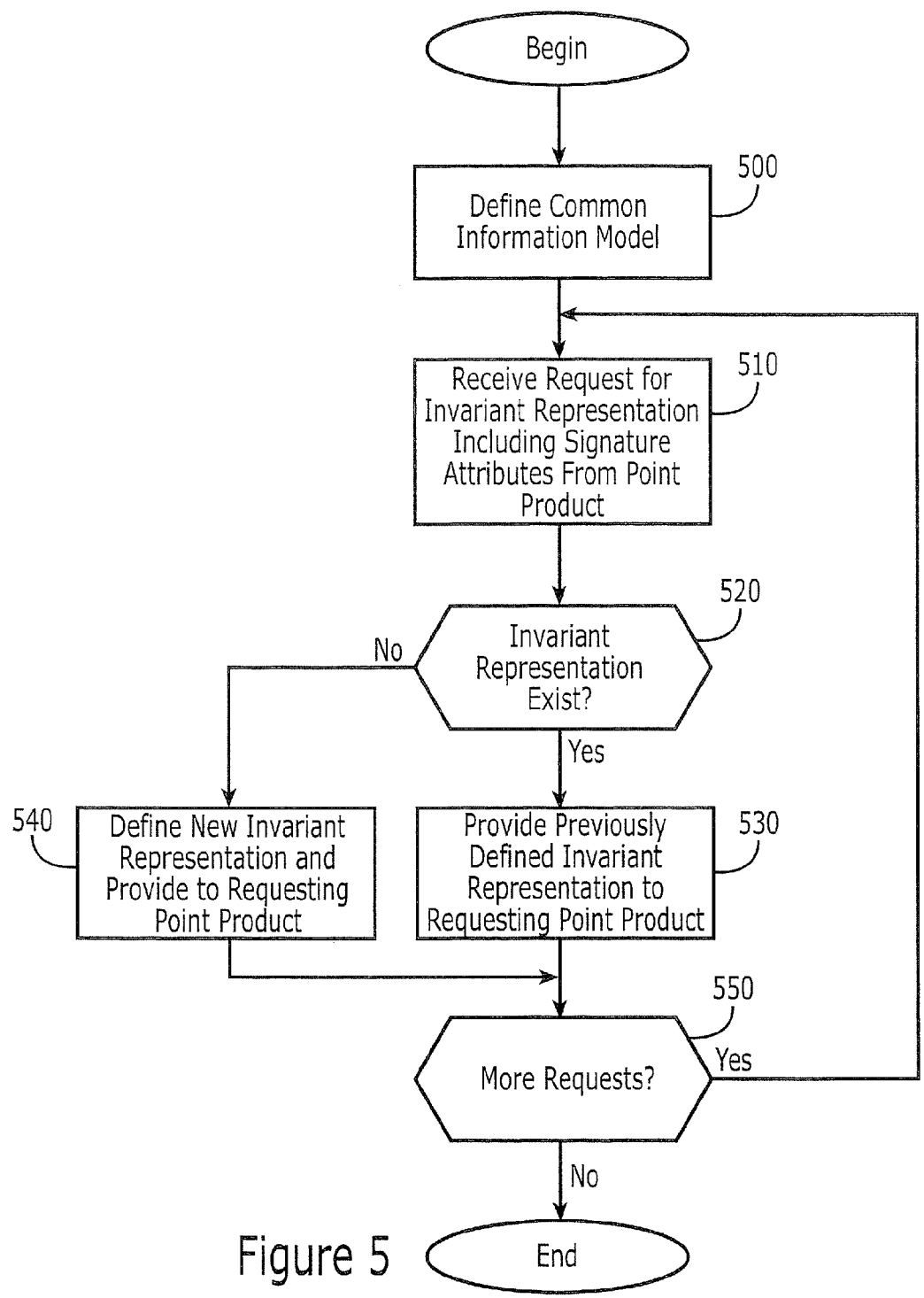

Accordingly, blocks of the block diagrams of FIGS. 1-3 and the flowcharts of FIGS. 4-6 support electronic circuits and other means for performing the specified operations, as well as combinations of operations. It will be understood that the circuits and other means supported by each block and combinations of blocks can be implemented by special purpose hardware, software or firmware operating on special or general purpose data processors, or combinations thereof. It should also be noted that, in some implementations, the operations noted in the blocks may occur out of the order noted in the figures. For example, two blocks shown in succession may, in fact, be executed substantially concurrently, or the blocks may sometimes be executed in the reverse order.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A computer-implemented method for invariant representation of computer network information technology (IT) managed resources, comprising:

communicatively coupling a computing device executing the method to the computer network;

defining a common information model for representing the managed resources;

receiving at the computing device from a first IT resource management point product application that is configured to manage IT resources an identification of a resource managed by the first IT resource management point product application and by a second IT resource management point product application that is configured to manage IT resources, the identification including an identification of a representation used by the first point product application for the resource managed by the point product applications, wherein the identification of the representation used by the first point product application for the resource managed by the point product applications comprises a list of signature attributes known by the first point product application for the resource managed by the point product applications and wherein the signature attributes comprise a domain name system (DNS) name, a Net-bios name, an internet protocol (IP) address or a media access control (MAC) address and wherein the representation used by the first point product application is determined based on a representation protocol used by the first point product application, wherein the representation use by the first point product application is not used by the second point product application and wherein the second point product application has a representation used by the second point product application for the resource managed by the point product applications that is not used by the first point product application;

determining using the computing device if an invariant representation for the resource managed by the point product applications has previously been defined under the common information model;

associating using the computing device the representation used by the first point product application for the resource managed by the point product applications with the previously defined invariant representation for the resource managed by the point product applications when an invariant representation for the resource managed by the point product applications has been previously defined; and defining using the computing device a new invariant representation for the resource managed by the point product applications and associating the representation used by the first point product application for the resource managed by the point product applications with the new invariant representation when an invariant representation for resource managed by the point product applications has not been previously defined, wherein the new invariant representation is a unique representation under the common information model, wherein the first point product application is different from the second point product application.

2. The method of claim 1, wherein the method further comprises:

receiving an identification of a resource managed by the second IT resource management point product application from the second point product application, the second point product application using a different representation protocol than the first point product application, the identification including a representation used by the second point product application for the resource managed by the second point product application that is determined based on the representation protocol used by the second point product application;

determining if an invariant representation for the resource managed by the second point product application has previously been defined under the common information model;

associating the representation used by the second point product application for the resource managed by the second point product application with the previously defined invariant representation for the resource managed by the second point product application when an invariant representation for the resource managed by the second point product application has been previously defined; and defining a new invariant representation for the resource managed by the second point product application and associating the representation used by the second point product application for the resource managed by the second point product application with the new invariant representation when an invariant representation for resource managed by the second point product application has not been previously defined, wherein the new invariant representation is a unique representation under the common information model.

3. The method of claim 2, wherein the resource managed by the point product applications and the resource managed by the second point product application comprise a same network resource and wherein determining if an invariant representation for the resource managed by the second point product application has previously been defined under the common information model comprises determining that an invariant representation for the resource managed by the second point product application has previously been defined under the common information model and the previously defined invariant representation has the representation used by the first point product application for the same network resource associated therewith and wherein associating the representation used by the second point product application for the resource managed by the second point product application with the previously defined invariant representation comprises associating the representation used by the second point product application for the same network resource with the previously defined invariant representation to provide the same network resource with a single invariant representation under the common information model linked to the respective representations used by both the first and second point product applications.

4. The method of claim 3, wherein the method further comprises:
receiving a request to provide IT resource management values, the requested resource management values including performance values, availability values, configuration vulnerability values or security incident values, the request including an identification of the previously defined invariant representation;
obtaining a first view of IT resource management values available from the first point product application based on the representation used by the first point product application for the same network resource responsive to the received request to provide IT resource management values;
obtaining a second view of IT resource management values available from the second point product application based on the representation used by the second point product application for the same network resource responsive to the received request to provide IT resource management values; and
providing a combined view of IT resource management values based on the obtained first and second views.

5. The method of claim 4, wherein obtaining a first view includes communicating with the first point product application using an application program interface (API) of the first point product application and wherein obtaining a second view includes communicating with the second point product application using an application program interface (API) of the second point product application.

6. The method of claim 4, wherein receiving a request to provide IT resource management values comprises receiving the request to provide IT resource management values from a higher level management application and wherein obtaining the first view is carried out by a first management service application that implements the common information model for the first point product application and wherein obtaining the second view is carried out by a second management service application, different from the first management service application, that implements the common information model for the second point product application.

7. The method of claim 2, wherein the identification of the representation used by the second point product application for the resource managed by the second point product application comprises a list of signature attributes known by the second point product application for the resource managed by the second point product application and wherein determining if an invariant representation for the resource managed by the point products has been previously defined includes comparing the list of signature attributes from the first point product application with signature attributes of previously defined invariant representations under the common information model and wherein determining if an invariant representation for the resource managed by the second point product application has been previously defined includes comparing the list of signature attributes from the second point product application with signature attributes of previously defined invariant representations under the common information model.

8. The method of claim 7, wherein the method further comprises providing the previously defined or new invariant representation to the first and second point product application.

9. A computer program product for invariant representation of computer network information technology (IT) managed resources, the computer program product comprising computer program code embodied in a non-transitory computer readable medium, the computer program code comprising program code configured to carry out the method of claim 2.

10. A computer-implemented method for invariant representation of computer network information technology (IT) managed resources, comprising:
communicatively coupling a computing device executing the method to the computer network;
defining a common information model for representing the managed resources;
receiving at the computing device from a first IT resource management point product application that is configured to manage IT resources a request for an invariant representation of one of the managed resources, the request including a list of signature attributes known by the first point product application for the one of the managed resources, wherein the list of signature attributes known by the first point product application is different from the list of signature attributes known by a second point product application that is configured to manage IT resources and wherein the one of the managed resources is managed by both the first and the second point product applications, wherein the signature attributes comprise a domain name system (DNS) name, a Net-bios name, an internet protocol (IP) address or a media access control (MAC) address;
determining using the computing device if an invariant representation for the one of the managed resources has previously been defined under the common information model;
providing the previously defined invariant representation to the requesting first point product application when the invariant representation for the one of the managed resources has previously been defined; and
defining using the computing device a new invariant representation for the one of the managed resources and providing the new invariant representation to the requesting first point product application when the invariant representation for the one of the managed resources has not been previously been defined, wherein the new invariant representation is a unique representation under the common information model, wherein the first point product application is different from the second point product application.

11. The method of claim 10, wherein determining if an invariant representation for the resource managed by the point product applications has previously been defined includes comparing the list of signature attributes from the first point product application with signature attributes of previously defined invariant representations under the common information model.

12. The method of claim 11, wherein receiving a request comprises receiving requests for an invariant representation from a plurality of different point product applications, including the first point product application and the second point product application, ones of which use different representation protocols for representing managed resources.

13. The method of claim 12, wherein the method further comprises:
receiving a request to provide IT resource management values, the requested resource management values including performance values, availability values, configuration vulnerability values or security incident values, the request including an identification of the previously defined invariant representation;

obtaining a first view of IT resource management values for the one of the managed resources associated with the previously defined invariant representation from the first point product application;

obtaining a second view of IT resource management values for the one of the managed resources associated with the previously defined invariant representation from the second point product application; and providing a combined view of IT resource management values based on the obtained first and second views.

14. The method of claim 13 wherein receiving the request comprises receiving the request from an integrated network management application and wherein providing a combined view comprises providing the combined view to the integrated network management application and wherein obtaining a first view, obtaining a second view and providing a combined view are carried out by a management service application coupled between the first and second point product applications and the integrated network management application.

15. The method of claim 14, further comprising the following carried out by the integrated network management application:

obtaining a user friendly name associated with the previously defined invariant representation;

modifying the combined view of IT resource management values based on the obtained user friendly name; and presenting the modified combined view of IT resource management values to a user.

16. The method of claim 15, wherein obtaining a user friendly name comprises obtaining the user friendly name from a resource name resolution service application that is operatively coupled to the integrated network management application and the point product applications and wherein receiving a request for an invariant representation, determining if an invariant representation for the one of the managed sources, providing the previously defined invariant representation and defining a new invariant representation are carried out by the resource name resolution service application.

17. A computer program product for invariant representation of computer network information technology (IT) managed resources, the computer program product comprising computer program code embodied in a non-transitory computer readable medium, the computer program code comprising program code configured to carry out the method of claim 13.

18. A computer program product for invariant representation of computer network information technology (IT) managed resources, the computer program product comprising:

a non-transitory computer-readable medium having computer-readable program code embodied in said medium, said computer-readable program code comprising:

computer-readable program code that receives from a first IT resource management point product application that is configured to manage IT resources an identification of a resource managed by the first IT resource management point product application and by a second IT resource management point product application that is configured to manage IT resources, the identification including an identification of a representation used by the first point product application for the resource managed by the point product applications, wherein the identification of the representation used by the first point product application for the resource managed by the point product applications comprises a list of signature attributes known by the first point product application for the resource managed by the point product applications and wherein the signature attributes comprise a domain name system (DNS) name, a Net-bios name, an internet protocol (IP) address or a media access control (MAC) address and wherein the representation used by the first point product application is determined based on a representation protocol used by the first point product application, wherein the representation use by the first point product application is not used by the second point product application and wherein the second point product application has a representation used by the second point product application for the resource managed by the point product applications that is not used by the first point product application;

computer-readable program code that determines if an invariant representation for the resource managed by the point products has previously been defined under a common information model defined for representing the managed resources;

computer-readable program code that associates the representation used by the first point product for the resource managed by the point product applications with the previously defined invariant representation for the resource managed by the point product applications when an invariant representation for the resource managed by the point product applications has been previously defined; and computer-readable program code that defines a new invariant representation for the resource managed by the point product applications and associating the representation used by the first point product application for the resource managed by the point product applications with the new invariant representation when an invariant representation for resource managed by the point product applications has not been previously defined, wherein the new invariant representation is a unique representation under the common information model and wherein the first point product application is different from the second point product application.

* * * * *